United States Patent [19]

Bolognia et al.

[11] Patent Number: 5,709,300

[45] Date of Patent: Jan. 20, 1998

[54] SLIDE TRAY PACKAGE FOR RECORDING MEDIUM

[75] Inventors: David Bolognia, Lanesboro, Mass.; Arthur Kern, Rye, N.Y.; Patrick O'Brien, Maywood, N.J.; George Rufo, Jr., Dalton, Mass.; Veronica Ann Buffington, Plainfield, N.J.

[73] Assignee: Ivy Hill Corporation, New York, N.Y.

[21] Appl. No.: 788,555

[22] Filed: Jan. 24, 1997

Related U.S. Application Data

[63] Continuation-in-part of Ser. No. 51,759, Mar. 18, 1996.

[51] Int. Cl.$^6$ .................................................. B65D 85/57
[52] U.S. Cl. .................... 206/308.1; 206/309; 206/564
[58] Field of Search ............................. 206/308.1, 309, 206/310, 311, 312, 456, 555, 560, 564, 565; 312/9.47, 9.48, 9.64

[56] References Cited

U.S. PATENT DOCUMENTS

| | | | |
|---|---|---|---|
| 5,232,089 | 8/1993 | Kim | 206/312 |
| 5,360,107 | 11/1994 | Chasin et al. | 312/9.48 |
| 5,366,073 | 11/1994 | Turrentin et al. | 206/309 |
| 5,562,207 | 10/1996 | O'Brien et al. | 206/312 |
| 5,611,426 | 3/1997 | Warfield | 206/308.1 |
| 5,651,458 | 7/1997 | Brosmith et al. | 206/308.1 |

*Primary Examiner*—David T. Fidei
*Attorney, Agent, or Firm*—Amster, Rothstein & Ebenstein

[57] ABSTRACT

A slide tray package has, in combination, a slide tray for holding a recording medium (such as a compact disc or audio cassette) and a housing therefor. In the slide tray a receiving area is disposed between the ends and sides thereof for receiving the recording medium for horizontal movement therewith. The slide tray leading end is adapted for automated loading of the slide tray into the housing by being both horizontally tapered and vertically beveled to facilitate telescopic insertion of the slide tray leading end through a leading end of the housing and into a trailing end of the housing. The slide tray trailing end defines a vertically protruding lip configured and dimensioned as a stop for engaging a leading end of the housing to limit the telescopic insertion of the slide tray into the housing. In the housing, the leading end of each of the top and bottom housing faces is configured and dimensioned to enable direct grasping of the slide tray by the user, and the leading end of each of the housing sides is configured and dimensioned to frictionally engage the slide tray, thereby to inhibit accidental telescopic slippage of the slide tray out of the housing.

14 Claims, 5 Drawing Sheets

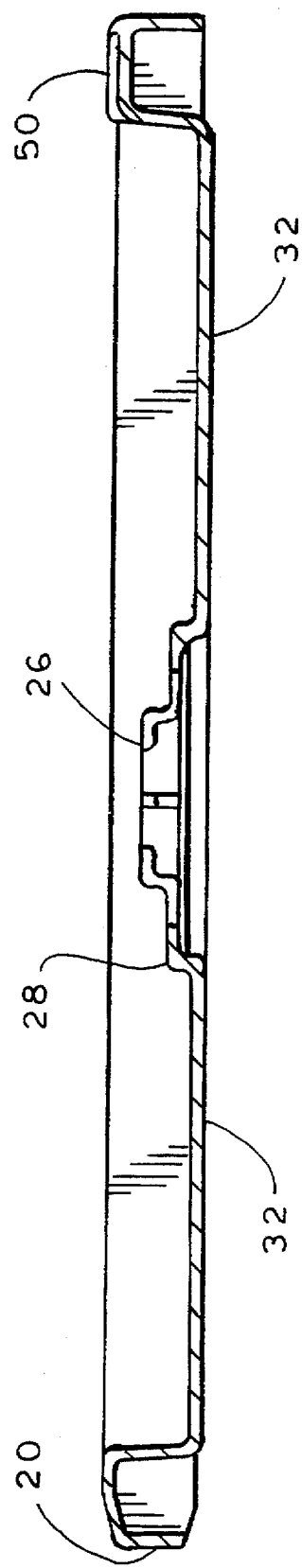
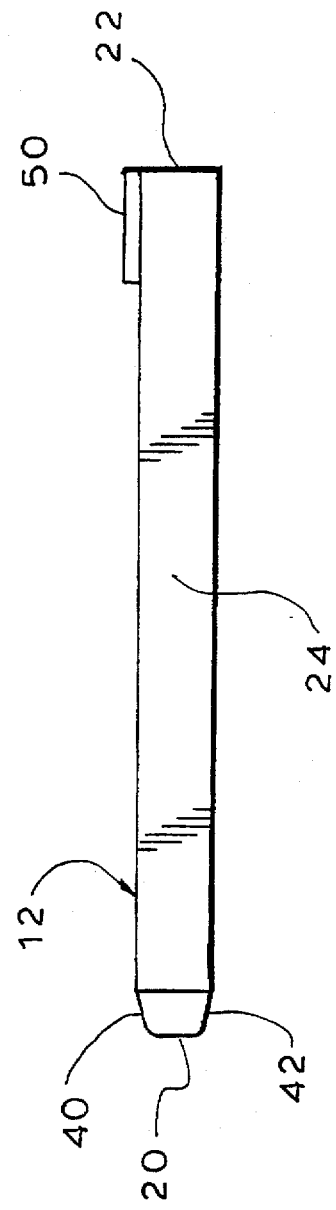
FIG. 3
FIG. 4

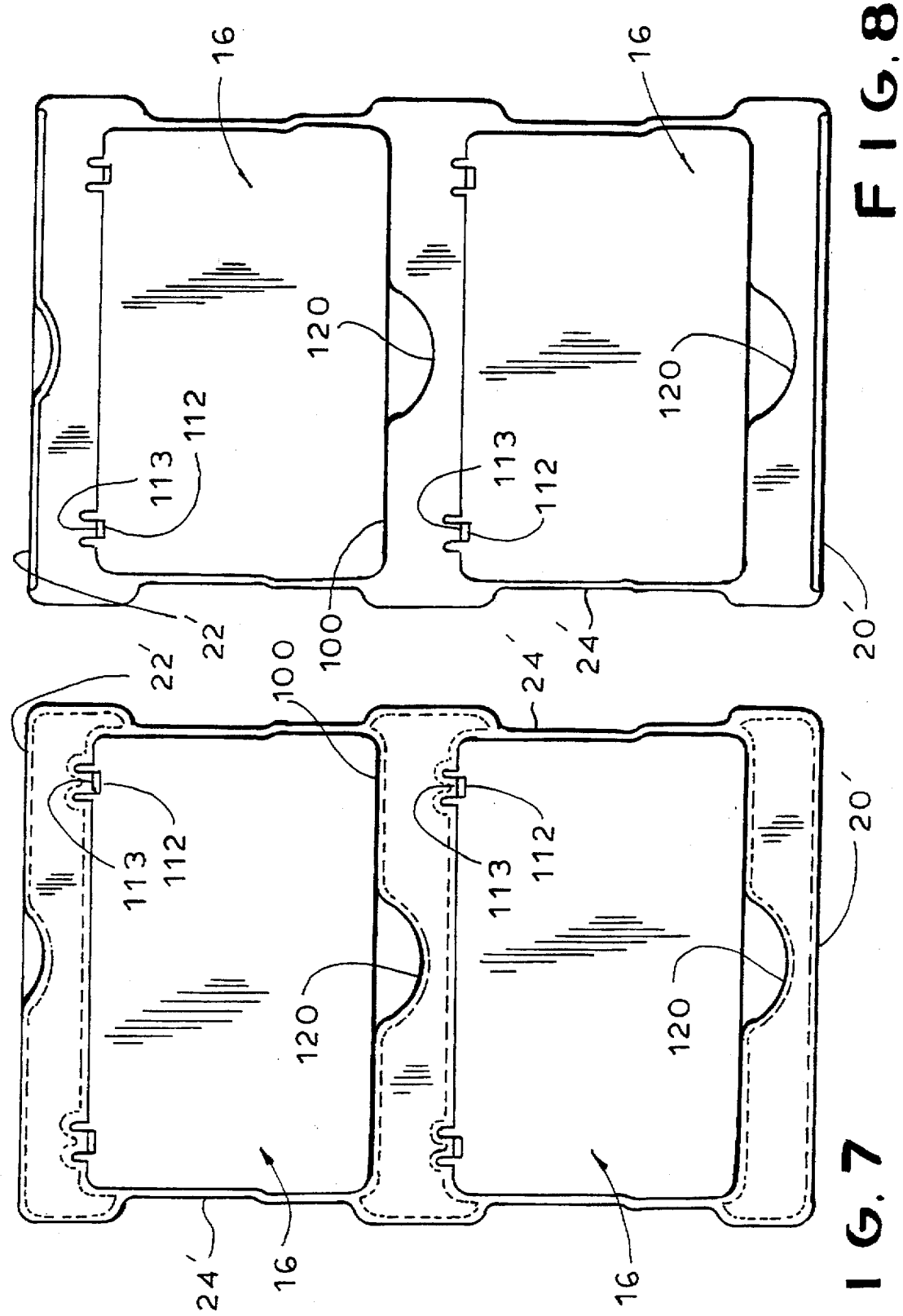

SLIDE TRAY PACKAGE FOR RECORDING MEDIUM

CROSS-REFERENCE TO RELATED APPLICATION

This is a continuation-in-part of U.S. Design Patent Application No. 29/051,759, filed Mar. 18, 1996, still pending.

BACKGROUND OF THE INVENTION

The present invention relates to a slide tray package, and more particularly to a slide tray for a recording medium (e.g., a compact disc) and a housing therefor, which components lend themselves to assembly by automated equipment.

It is known to provide, in combination, an open-ended hollow rectangular parallelepiped or box-like housing and a slide tray having a rectangular periphery configured and dimensioned to be received telescopically within the housing. See, for example, the conventional box of kitchen matches.

In the compact disc packaging field, it is also known to form the housing out of paperboard and the slide tray of plastic (typically injection molded). The slide tray has a recess in the top face thereof which defines a rosette configured and dimensioned to receive a compact disc thereon for sliding movement with the slide tray into and out of the housing.

This slide tray package combination has presented certain problems to the manufacturer thereof who assembles the various components into the combination. Ideally, the compact disc is placed on the rosette of the slide tray (either manually or by automated equipment) and then the leading end of the slide tray is initially moved into the leading end of the housing and then further moved in the same direction until the leading end of the slide tray is aligned with the trailing end of the housing. The first manufacturing difficulty encountered is that the leading end of the slide tray is somewhat snugly received by the leading end of the housing so that, if there is the slightest misalignment between the two leading ends (either horizontally or vertically), the housing leading end will not receive the slide tray leading end therein. There is no forgiveness for misalignments, manufacturing imprecisions or the like. The second manufacturing difficulty is that an external stop means must be disposed adjacent the trailing end of the housing during the insertion process to ensure that the automated equipment telescopically inserting the slide tray into the housing does not cause the slide tray leading end to pass beyond (and protrude from) the housing trailing end.

Accordingly, it is an object of the present invention to provide a slide tray package which lends itself to the use of automated equipment in combining the components thereof.

Another object is to provide such a package wherein minor misalignments of the leading ends of the slide tray and housing (either vertically or horizontally) are forgiven and the alignment is self-correcting.

A further object is to provide such a package wherein the telescopic insertion of the slide tray into the housing is automatically limited by the components themselves to prevent over-insertion (that is, movement of the slide tray leading end beyond the housing trailing end) without an external stop.

It is also an object of the present invention to provide such a package wherein, in a preferred embodiment, the slide tray is easily graspable by the user, even when the slide tray is telescopically inserted into the housing to the maximum possible extent, to facilitate movement of the slide tray relative to the container.

It is a further object to provide such a package wherein the container sides frictionally engage the slide tray to inhibit accidental telescopic disengagement thereof.

It is a further object to provide such a package wherein the lip or stop on the slide tray does not impede the desired telescopic action of the slide tray and the housing.

SUMMARY OF THE INVENTION

It has now been found that the above and related objects of the present invention are obtained in a slide tray package according to the present invention comprising, in combination, a slide tray and a housing therefor. The slide tray defines a leading end, a trailing end, a pair of opposed, laterally spaced sides connecting the ends, and receiving means (such as a rosette or cassette holder) disposed between the ends and sides for receiving a recording medium (such as a compact disc or audio cassette) for horizontal movement therewith. The slide tray leading end is adapted for automated loading of the slide tray into the container by being both horizontally tapered and vertically beveled to facilitate telescopic insertion of the slide tray leading end through a leading end of the container and into a trailing end of the container. The slide tray trailing end defines a vertically protruding lip configured and dimensioned as a stop for engaging a leading end of the container to limit the telescopic insertion of the slide tray into the container. The container defines a pair of opposed, vertically spaced top and bottom faces and a pair of opposed, laterally spaced sides connecting the top and bottom faces, each face and each container side having a leading end and a trailing end. The leading end of each of the faces is configured and dimensioned to enable direct grasping of the slide tray by the user, and the leading end of each of the container sides is configured and dimensioned to frictionally engage the slide tray, thereby to inhibit accidental telescopic slippage of the slide tray out of the container.

In a preferred embodiment, the vertically protruding lip is raised relative to the remainder of the slide tray and extends along the entire slide tray trailing end. The leading end of one of the container faces is cut back relative to the leading end of the other of the container faces by at least the thickness of the vertically protruding lip. Thus, when the vertically protruding lip is raised, the leading end of the top face is cut back, relative to the leading end of the bottom face, to receive the same.

Preferably the leading ends of the container sides (and preferably the trailing ends as well) are vertically crimped to enhance friction between the crimped ends and the slide tray, thereby to inhibit accidental slippage of the slide tray out of the container.

Preferably the leading ends of the top and bottom faces define cut-out areas enabling direct grasping of the slide tray. In any case, the slide tray trailing end is directly graspable when the slide tray is telescopically inserted into the container to the greatest extent possible.

The present invention additionally encompasses the package in combination with a compact disc or audio cassette disposed on the receiving means.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein:

FIG. 3 is a sectional view thereof taken along the line 3—3 of FIG. 2;

FIG. 4 is a side view thereof;

FIGS. 7 and 8 are top and bottom plan views thereof, respectively, with audio cassettes in the compartments.

DETAILED DESCRIPTION OF THE PREFERRED EMBODIMENTS

Figure 1:
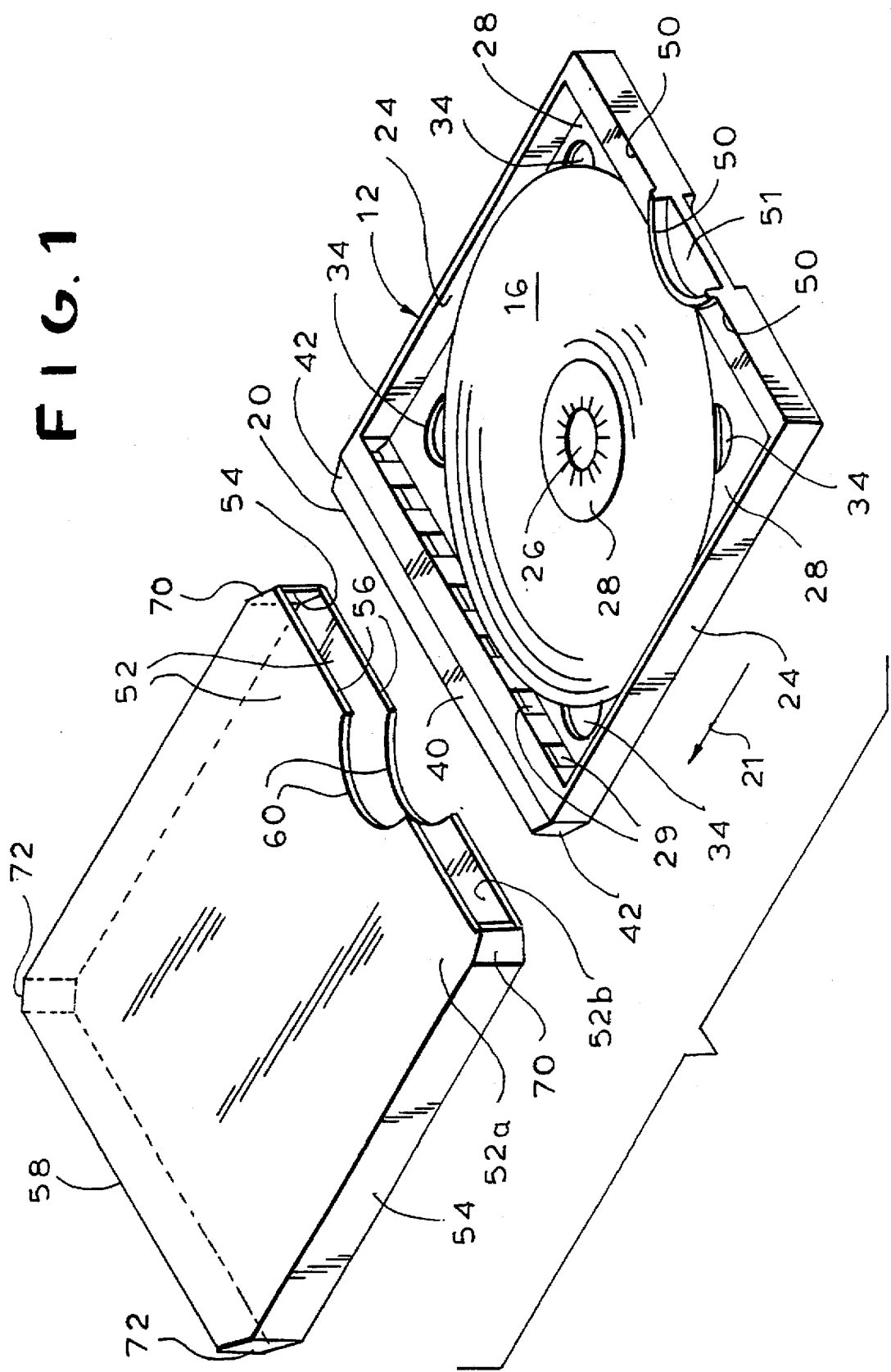
FIG. 1 is an isometric exploded view of the slide tray package according to the present invention showing the slide tray and housing separately.

Referring now to the drawing, and in particular to FIG. 1 thereof, therein illustrated is a slide tray package according to the present invention, generally designated by the reference numeral 10. The package comprises a slide tray generally designated 12, a housing generally designated 14, and optionally a recording medium generally designated 16 in the form of a compact disc (or like digital recording medium), as illustrated, or an audio cassette (or like analog recording medium). The package 10 is designed to include the optional recording medium 16, as illustrated in FIG. 1, although at times it will not.

Figure 2:
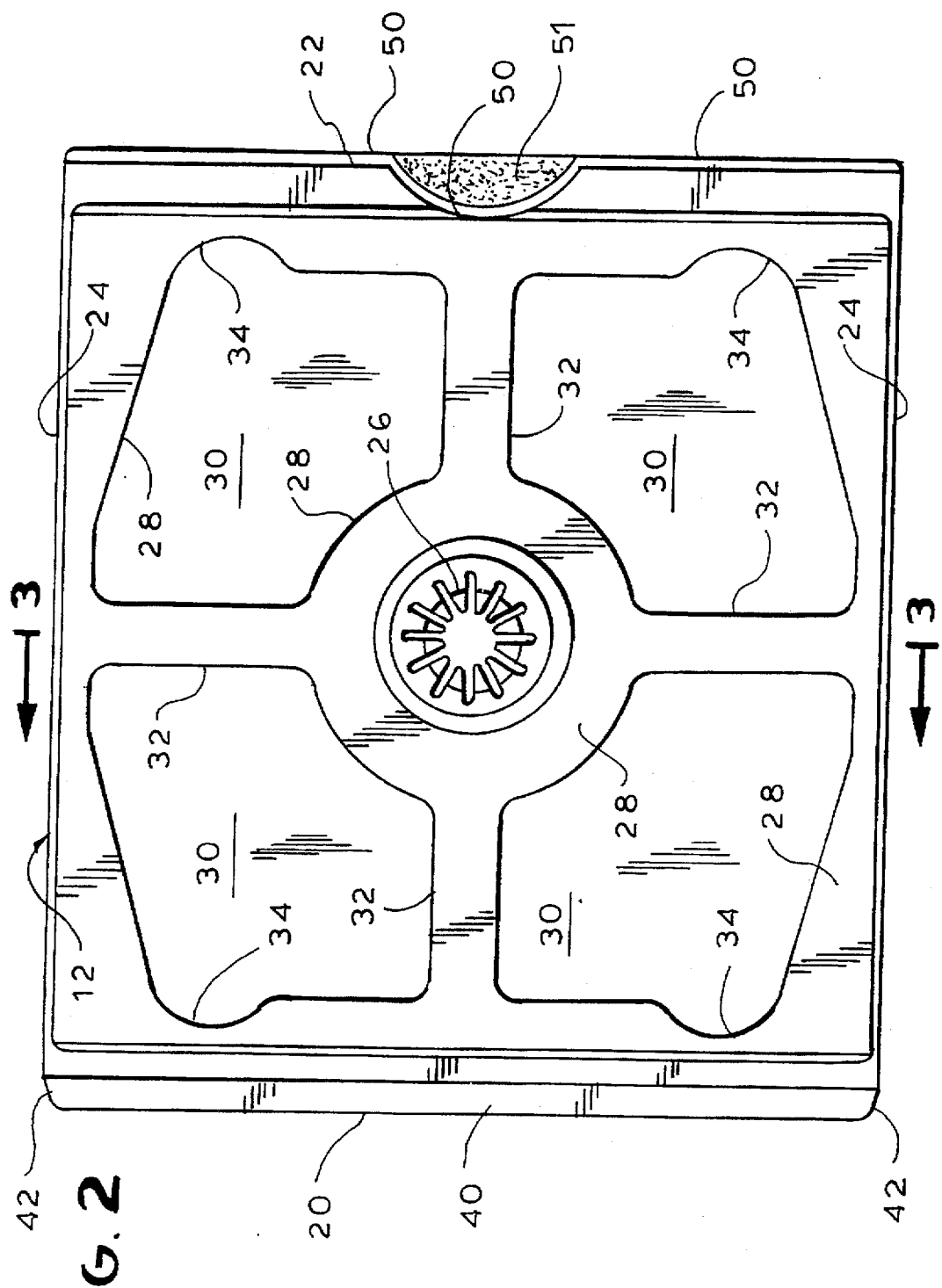
FIG. 2 is a top plan view of the slide tray.

Referring now to FIGS. 2–4 as well, the slide tray 12 has a leading end 20 (which is the end that first enters the housing 14 in the direction of arrow 21 during the insertion process), a trailing end 22 opposite the leading end 20, a pair of laterally spaced sides 24 connecting the ends 20, 22, and a body 28 connecting the ends 20, 22 and sides 24. A conventional rosette 26 is disposed on the slide tray body 28 and configured and dimensioned to receive the compact disc 16 thereon for sliding movement therewith relative to housing 14. Except as noted hereinafter, the heights of the ends 20, 22 and the sides 24 are substantially the same, although the body 28 is substantially thinner.

In order to lighten the slide tray 12 and reduce the amount of material used therein, each of the ends 20, 22 has the general cross section of an inverted "U", with the outer legs of the inverted "U"'s being the trailing and leading edges of the slide tray 12 and the inner legs connecting the inverted "U"'s to the tray body 28. For the reasons aforestated, the inner legs of the inverted "U"'s may be apertured, as illustrated at 29 for the leading end 20.

For much the same reasons, the slide tray body 28 defines a plurality of cut-away portions 30 so that what remains of the body 28 are the structural members 32 connecting the rosette 26 to the ends 20, 22 and sides 24 of the slide tray 12. The cut-away portions 30 also define cut-away finger holes 34 which facilitate manual removal of the compact disc 16 from the rosette 26, and hence the tray 12.

A critical feature of the present invention concerns the configuration and dimensions of the slide tray leading end 20. This leading end 20 is both horizontally tapered inwardly and vertically tapered inwardly (i.e., towards a central plane therebetween) to facilitate telescopic insertion of the slide tray leading end 20 through a leading end of the housing 14 and into the trailing end of the housing 14. This greatly facilitates automatic loading of the slide tray 12, either with or without the compact disc 16 thereon, by providing automatic compensation and self-corrction for a minor misalignment of the leading ends of the slide tray 12 and the housing 14.

The vertical taper or bevel 40 of the slide tray leading end 20 allows for a vertical misalignment of the slide tray leading end 20 and the container leading end. The vertical bevel 40 may be exclusively on either the top or bottom surface of the slide tray leading end 20 (and is shown being exclusively on the top surface thereof), but may also be on both the top and bottom of the slide tray leading end 20. The horizontal bevel or taper 42 of the sides 24 of the slide tray leading end 20 allows for a lateral misalignment of the slide tray leading end 20 and the housing leading end. The horizontal taper 42 may be disposed only on one side or the other of the slide tray leading end 20, but preferably it is disposed on both sides thereof, as illustrated. Thus, even compound misalignments (that is, misalignments between the slide tray and the housing having both horizontal and vertical components) are automatically compensated for due to the smoothly reduced size in both dimensions of the slide tray leading end 20 relative to the housing leading end.

Turning now from the slide tray leading end 20 to the slide tray trailing end 22, another critical feature of the present invention concerns the configuration and dimensions of the slide tray trailing end 22. The trailing end 22 defines a vertically protruding lip 50 which is configured and dimensioned as a stop for engaging a leading end of the housing 14 to limit the telescopic insertion of the slide tray 12 into the housing 14 by automated equipment.

Preferably, as illustrated, the lip 50 is raised (i.e., protrudes upwardly) relative to the remainder of the slide tray 12, although alternatively the lip 50 may be depressed (i.e., protrude downwardly) relative to the remainder of the slide tray 12. Indeed, the lip 50 may extend both upwardly and downwardly relative to the remainder of the slide tray 12, although this is typically not necessary. Preferably the lip 50 extends along the entire trailing end 22 of the slide tray 12 between the sides 24. While this configuration provides the most secure stop mechanism, it will be appreciated that an effective stop mechanism may be provided by a lip 50 which is either interrupted or extends along only a fraction of the entire slide tray trailing end 22, for example, extending inwardly from both tray sides 24.

In order to facilitate grasping of the slide tray trailing end 22 for at least partial telescopic disengagement of the slide tray 12 from the housing 14, a portion 51 of the length of the slide tray trailing end 22 is preferably of reduced thickness and horizontally arcuate on the top and bottom thereof, thereby to accommodate grasping by a pair of fingertips.

Turning now from the slide tray 12 to the housing 14, and referring again to FIG. 1 in particular, the housing 14 is shaped generally like an open-ended rectangular parallelepiped. The housing 14 is preferably formed from a blank with cut score foldlines to facilitate automated set up of the housing from the blank. The housing 14 defines a pair of opposed, vertically spaced top and bottom faces 52, and a pair of opposed, laterally spaced sides 54 connecting the top and bottom faces 52. Each such face 52 and each such housing side 54 has a leading end 56 and an opposed trailing end 58. The leading end 56 of the container 14 is the end of the container into which the slide tray 12 (and in particular the leading end 20 thereof) is initially inserted.

The leading end 56 of each of the top and bottom faces 52 is configured and dimensioned to enable a user to directly grasp the slide tray trailing end 22, and in particular the flattened portion 51, between a pair of fingers. More particularly, the leading ends 56 of both faces 52 preferably define cut-out portions or finger holes 60 enabling the user to directly grasp the slide tray 12, even when the slide tray 12 is telescopically inserted into the housing 14 to the greatest extent possible. Preferably the cut-out portions 60 of the respective faces 52 are vertically aligned with the flattened portion 51 of the slide tray trailing end 22, thereby to enable the user to grasp the flattened portion 51 of the slide tray with his fingers. Alternatively, the top and bottom faces 52 may be devoid of cut-out portions 60, and the slide tray trailing end 22 instead provided with a lug or handle (not shown) extending in the trailing direction further than the faces 52 so that the handle is always readily accessible, even when the slide tray 12 is telescopically inserted into the housing 14 to the greatest extent possible.

Where the lip 50 extends vertically in only one direction (that is, the lip 50 protrudes either above or below the remainder of the slide trade trailing end 22, but not both), the leading end 56 of one of the housing faces 52 is preferably cut back relative to the leading end 56 of the other of the housing faces 52 by at least the thickness of the lip 50, thereby to accommodate the same while still allowing the maximum possible telescopic action. For example, as illustrated, the lip 50 is raised, and the leading end of the top housing face 52a is cut back relative to the leading end of the bottom housing face 52b by at least the thickness of the lip 50. Thus, the bottom face 52b extends to the far edge of the slide tray trailing end 22 at the bottom thereof (and optionally therebeyond) even though the top housing face 52a does not completely cover the slide tray trailing end 22 at the top thereof (because the lip 50 abuts against the housing top face 52a and precludes further telescopic insertion of the slide tray 12 into the housing 14). The configuration and height of the lip 50 conforms to that of the leading end 56 of the top housing face 52a.

Additionally, the leading end 56 of each of the housing sides 54 is preferably configured and dimensioned to frictionally engage the slide tray 12, especially the slide tray sides 24, thereby to inhibit accidental telescopic disengagement thereof (i.e., slippage of the slide tray 12 out of the housing 14). To this end, the leading ends 56 of the housing sides 54 are preferably vertically crimped at 70 to enhance friction between the crimped leading ends 56 and the slide tray 12. The crimping also facilitates sliding of the slide tray 13 relative to the container 14 without binding or catching on the cut score folds thereof. To further enhance the security against accidental telescopic disengagement, as illustrated it is preferred that the trailing end 58 of the housing sides 54 also be vertically crimped in a similar fashion at 72 to enhance friction between these crimped trailing ends 58 and the slide tray 12 when the slide tray is telescopically inserted into the housing to the greatest extent possible. Indeed, where additional security against accidental telescopic disengagement is required, all or additional portions of the housing sides 54 may also be vertically crimped in a similar fashion to enhance friction.

Preferably, the housing 14 is formed of paperboard or like materials (other than plastic), and the slide tray 12 is formed of plastic (preferably an injection-molded plastic).

The slide tray 12 has been illustrated in the form of a slide tray adapted to receive a compact disc as the recording medium 16. However, it will be clear that the principles of the present invention may be applied to slide trays adapted to receive other recording media as well. For example, referring now to FIGS. 5-8, therein illustrated is a slide tray 12' adapted to hold from one to four audio cassettes (or like analog recording media) as the recording medium 16. The slide tray 12' includes a leading end 20', a trailing end 22', and a pair of laterally spaced sides 24', these elements of the slide tray 12' being similar to those of the slide tray 12 and also facilitating automatic loading of the slide tray 12' in a housing 14, either with or without the audio cassettes 16 thereon, by providing automatic compensation and self-correction for a minor misalignment of the leading ends of the slide tray 12' and the housing 14. The trailing end 22' of the slide tray 12' also provides the desired stop mechanism.

Figure 5:
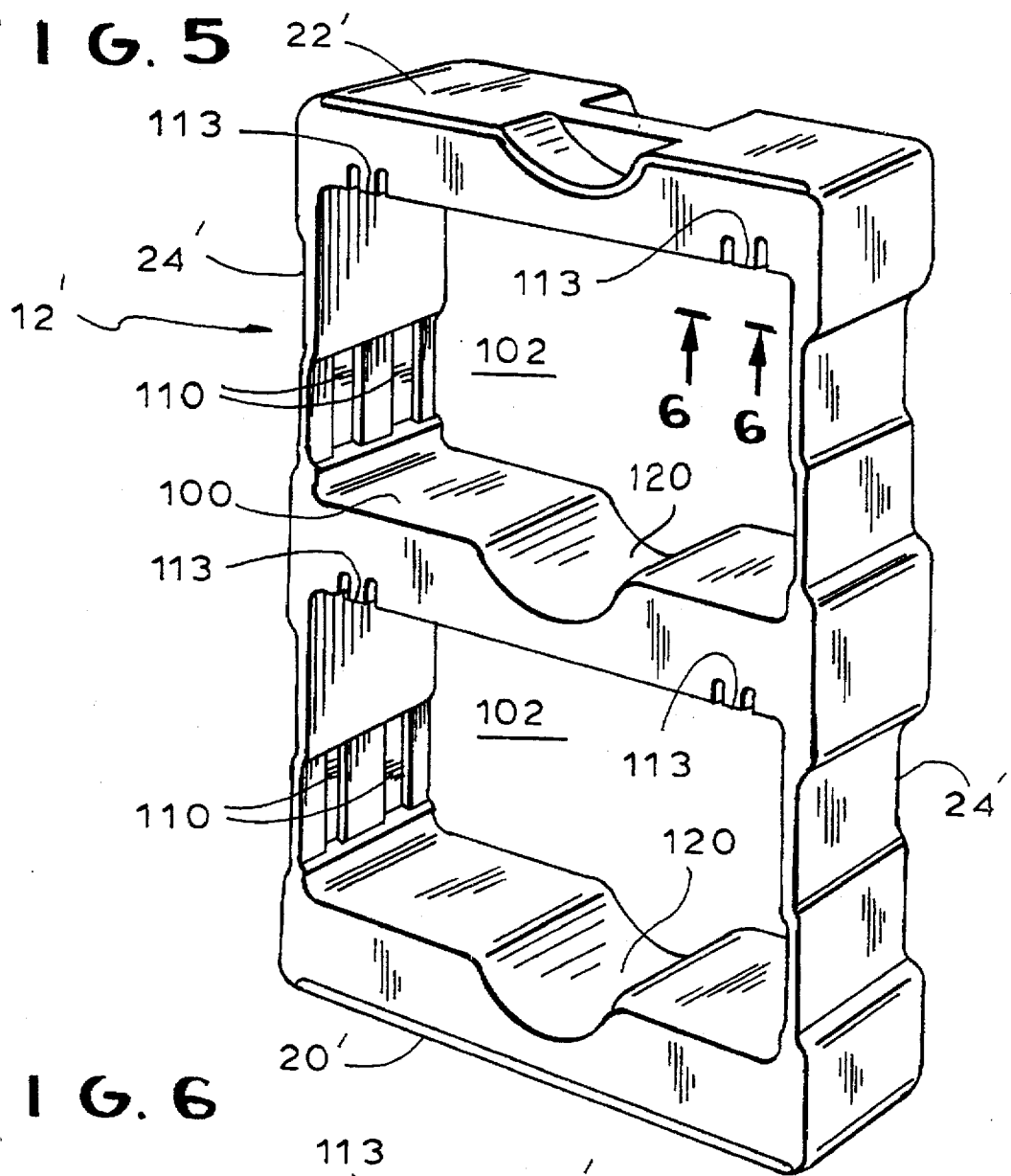
FIG. 5 is an isometric view of an alternative slide tray.
Figure 6:
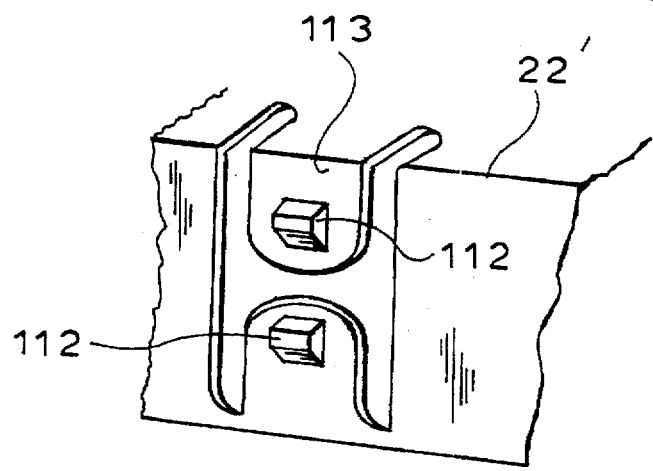
FIG. 6 is a fragmentary isometric view thereof, taken along the line 6—6 of FIG. 5.

The slide tray 12' differs from the slide tray 12 described above in that it is adapted to carry a plurality of audio cassettes instead of a compact disc as the recording medium 16. The slide tray 12' is illustrated in FIG. 5 in a form which enables up to four cassettes to be carried thereby. Thus, a divider 100 divides the open space of the slide tray 12' into two compartments 102, each compartment 102 in turn being adapted to hold one or two cassettes. Typically an audio cassette includes an outwardly extending tab on each sidewall thereof, adjacent the front of the cassette. Additionally, an audio cassette typically includes a widely spaced apart pair of recesses in the back end of the cassette. The slide tray 12' makes use of these conventional cassette features by providing a vertically spaced pair of recesses 110 on each interior of sidewall 24' bordering a particular compartment 102 and a vertically spaced pair of slight bump projections 112 on the interior surface of a transverse member (both trailing end 22' and divider 100) bordering a compartment 102 adjacent each of the sides 24'. Thus, there are two recesses 110 on each side of each aperture 102 and two projections 112 on each end of the transverse members 22', 100. Thus, a cassette can be snapped into a compartment 102 from both the front and back thereof, with each cassette having its two side tabs being received in opposed recesses 110 and its two recesses on the cassette back end receiving projections 112. In order to facilitate grasping of the cassettes for moving them into and out of compartments 102, the trailing edge of the forward end 20' and the divider 100 define recessed finger grips 120.

To facilitate loading and unloading of the cassette (either from the top or bottom of the slide tray 12'), the projections 112 are preferably beveled at the top and bottom, thereby facilitating entry of the projections 112 into the recesses in the back end of the cassette. Preferably each projection 112 is separately mounted on a vertically flexible tab 113 secured to the transverse member (that is, the trailing end 22' or the divider 100) so that the tab 113 can flex inwardly slightly into the transverse member as the cassette is being loaded or unloaded from the slide tray 12'. Each flexible tabs 113 is defined by a recess or cut-out formed in the transverse member about and behind the tab 113 so as to leave the tab 113 capable of flexing; e.g., by "coring-thru". The object is, of course, to allow the projections 112 to resiliently flex back and forth with the tabs 113, so as to enable the cassettes to seat themselves with the projections 112 at least partially in the recesses at the back of the cassette.

To further facilitate loading and unloading of the cassettes from the slide tray 12', the sidewalls 24' of the slide tray 12' may be thinner where they border a compartment 102 so that the sidewall 24' can readily flex, as necessary, to enable the outwardly extending tabs on the cassette to pass over the non-recessed portions of the sidewalls 24' and be received within the sidewall recesses 110.

Similar modifications of the slide tray 12, 12' may be introduced in order to enable the slide tray to accommodate different recording media 16 and different numbers of such recording media 16.

To summarize, the present invention provides a slide tray package formed of a slide tray and housing combination which lends itself to the use of automated equipment in combining the two components. Minor misalignments of the leading ends of the slide tray and housing (either vertically or horizontally) are forgiven, and the alignment is self-correcting. The telescopic insertion of the slide tray into the housing is automatically limited by the components themselves to prevent over-insertion (that is, movement of the slide tray leading end beyond the housing trailing end) without any need for an external stop. Additionally, the slide tray trailing end is easily graspable by the user, even when the slide tray is telescopically inserted into the housing to the greatest extent possible. The housing sides grasp the slide tray sides to inhibit accidental telescopic disengagement. Where the lip or stop extends vertically in only one direction, the face of the housing adjacent the lip or stop is cut back to accommodate the thickness thereof.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A slide tray package comprising, in a combination, a slide tray for holding a recording medium and a housing therefor:
   (A) said slide tray defining a leading end, a trailing end, a pair of opposed, laterally spaced sides connecting said ends, and means disposed between said ends and sides for receiving a recording medium for horizontal movement therewith,
      (i) said slide tray leading end being adapted for automated loading of said slide tray into said housing by being both horizontally tapered and vertically beveled to facilitate telescopic insertion of said slide tray leading end through a leading end of said housing and into a trailing end of said housing, and
      (ii) said slide tray trailing end defining a vertically protruding lip configured and dimensioned as a stop for engaging a leading end of said housing to limit said telescopic insertion of said slide tray into said housing; and
   (B) said housing defining a pair of opposed, vertically spaced top and bottom faces and a pair of opposed, laterally spaced sides connecting said top and bottom faces, each said face and each said housing side having a leading end and a trailing end,
      (i) said leading end of each of said top and bottom faces being configured and dimensioned to enable direct grasping of said slide tray by a user, and
      (ii) said leading end of each of said housing sides being configured and dimensioned to frictionally engage said slide tray, thereby to inhibit accidental telescopic slippage of said slide tray out of said housing.

2. The package of claim 1 wherein said heading ends of said housing sides are vertically crimped to enhance friction between said crimped leading ends and said slide tray, thereby to inhibit accidental slippage of said slide tray out of said housing.

3. The package of claim 2 wherein said trailing end of each of said housing sides is also vertically crimped.

4. The package of claim 1 wherein said vertically protruding lip is raised relative to the remainder of said slide tray.

5. The package of claim 1 wherein said vertically protruding lip extends along the entire slide tray trailing end.

6. The package of claim 1 wherein said leading end of one of said housing faces is cut back relative to the leading end of the other of said housing faces by at least the thickness of said vertically protruding lip.

7. The package of claim 1 wherein said vertically protruding lip is raised, and said leading end of said top face is cut back, relative to said leading end of said bottom face, to receive the same.

8. The package of claim 1 wherein said leading ends of said top and bottom faces define cut-out areas enabling direct grasping of said slide tray.

9. The package of claim 1 wherein said slide tray trailing end is directly graspable when said slide tray is telescopically inserted into said housing to the greatest extent possible.

10. The package of claim 1 wherein said slide tray is found of plastic, and said housing is formed of paperboard.

11. A slide tray package comprising, in combination, a slide tray for holding a recording medium and a housing therefor:
   (A) said slide tray defining a leading end, a trailing end, a pair of opposed, laterally spaced sides connecting said ends, and means disposed between said ends and sides for receiving a recording medium for horizontal movement therewith,
      (i) said slide tray leading end being adapted for automated loading of said slide tray into said housing by being both horizontally tapered and vertically beveled to facilitate telescopic insertion of said slide tray leading end through a leading end of said housing and into a trailing end of said housing, and
      (ii) said slide tray trailing end defining a vertically protruding lip extending along substantially the entire slide tray trailing end, and configured and dimensioned as a stop for engaging a leading end of said housing to limit said telescopic insertion of said slide tray into said housing; and
   (B) said housing defining a pair of opposed, vertically spaced top and bottom faces and a pair of opposed, laterally spaced sides connecting said top and bottom faces, each said face and each said housing side having a leading end and a trailing end,
      (i) said leading end of each of said top and bottom faces being configured, dimensioned and vertically crimped to enable direct grasping of said slide tray between a pair of fingers, and
      (ii) said leading and trailing ends of each of said housing sides being configured and dimensioned to inhibit accidental telescopic slippage of said slide tray out of said housing.

12. The package of claim 11 wherein said leading end of said housing top face is cut back relative to the leading end of said housing bottom face by at least the thickness of said lip, and said leading ends of said top and bottom faces define cut-out areas enabling direct grasping of said slide tray, said slide tray trailing end being directly graspable when said slide tray is telescopically inserted into said housing to the greatest extent possible.

13. The package of claim 11 additionally including a compact disc disposed on said receiving means for horizontal movement therewith.

14. The package of claim 11 additionally including an audio cassette disposed on said receiving means for horizontal movement therewith.

* * * * *